US007004143B2

(12) United States Patent
Fuwa

(10) Patent No.: US 7,004,143 B2
(45) Date of Patent: Feb. 28, 2006

(54) CONTROL APPARATUS AND CONTROL METHOD FOR INTERNAL COMBUSTION ENGINE

(75) Inventor: Naohide Fuwa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/079,086

(22) Filed: Mar. 15, 2005

(65) Prior Publication Data

US 2005/0155572 A1 Jul. 21, 2005

Related U.S. Application Data

(62) Division of application No. 10/665,018, filed on Sep. 22, 2003, now Pat. No. 6,895,927.

(30) Foreign Application Priority Data

Oct. 4, 2002 (JP) ............................ 2002-292493

(51) Int. Cl.
*F02D 1/00* (2006.01)

(52) U.S. Cl. ...................................... 123/336; 123/403

(58) Field of Classification Search ................ 123/336, 123/403, 405, 442
See application file for complete search history.

(56) References Cited

U.S. PATENT DOCUMENTS

| | | | | |
|---|---|---|---|---|
| 4,971,011 | A | 11/1990 | Nanyoshi et al. | |
| 5,090,389 | A | 2/1992 | Oota | |
| 5,541,844 | A | 7/1996 | Ibaraki et al. | |
| 6,014,955 | A | 1/2000 | Hosotani et al. | |
| 6,497,212 | B1 | 12/2002 | Matsumoto et al. | |
| 6,497,214 | B1 | 12/2002 | Yagi | |
| 6,732,707 | B1 * | 5/2004 | Kidokoro et al. | 123/396 |
| 2001/0002589 | A1 | 6/2001 | Kawasaki et al. | |

FOREIGN PATENT DOCUMENTS

| | | | |
|---|---|---|---|
| DE | 101 09 395 | A1 | 9/2001 |
| EP | 1 063 393 | A2 | 12/2000 |
| EP | 1 217 191 | A1 | 6/2002 |
| JP | A 2000-87766 | | 3/2000 |
| JP | A 2001-159325 | | 6/2001 |

* cited by examiner

*Primary Examiner*—John T. Kwon
(74) *Attorney, Agent, or Firm*—Oliff & Berridge, PLC

(57) ABSTRACT

A plurality of intake air amount control devices for controlling an amount of air drawn into a combustion chamber in association with a depression stroke of an accelerator pedal are provided. Each of the intake air amount control devices responds to a change in depression stroke of the accelerator pedal after the lapse of a predetermined delay period.

8 Claims, 8 Drawing Sheets

CONTROL APPARATUS AND CONTROL METHOD FOR INTERNAL COMBUSTION ENGINE

CROSS-REFERENCE TO RELATED APPLICATION

This is a Division of U.S. patent application Ser. No. 10/665,018, filed Sep. 22, 2003 now U.S. Pat. No. 6,895,927. The entire disclosure of the prior application is incorporated herein by reference in its entirety.

INCORPORATION BY REFERENCE

The disclosure of Japanese Patent Application No. 2002-292493 filed on Oct. 4, 2002 including the specification, drawings and abstract is incorporated herein by reference in its entirety.

BACKGROUND OF THE INVENTION

1. Field of the Invention

The invention relates to a control apparatus for an internal combustion engine and a control method for an internal combustion engine.

2. Description of the Related Art

A control apparatus for controlling operation of an electronic throttle valve for controlling an amount of air drawn into a combustion chamber of an internal combustion engine (intake air amount) is disclosed, for example, in Japanese Patent Application Laid-Open No. 10-89140. In this control apparatus, opening of the electronic throttle valve is controlled in accordance with depression stroke of an accelerator pedal (accelerator depression stroke). For instance, if a required torque increases as a result of an increase in accelerator depression stroke, an amount of intake air is increased by increasing an opening of the electronic throttle valve, while an amount of fuel injected from a fuel injection valve (fuel injection amount) is increased as well. Thus, the required torque is output from the internal combustion engine.

Fuel is injected from the fuel injection valve for a relatively short period after closure of an intake valve. An intake air amount must be estimated from an opening of the electronic throttle valve long before the intake valve is closed, for example, before the intake valve starts opening, and a fuel injection amount must be determined, on the basis of the intake air amount thus estimated, such that a desired air-fuel ratio is obtained. In this case, therefore, a fuel injection amount is determined before an intake air amount is confirmed.

For example, however, if a fuel injection amount is determined according to the procedure mentioned above when an opening of the electronic throttle continues to be increased as a result of a continuous increase in required torque, an actual intake air amount deviates from an intake air amount estimated at the time of determination of the fuel injection amount. Therefore, a desired air-fuel ratio cannot be obtained.

In Japanese Patent Application Laid-Open No. 10-89140, therefore, an opening of an electronic throttle valve is not immediately increased even after an increase in accelerator depression stroke. Instead, the opening of the electronic throttle valve is increased after the lapse of a certain delay period. The delay period is set such that the electronic throttle valve assumes an opening corresponding to an accelerator depression stroke at the time of determination of a fuel injection amount when an intake valve is closed. A fuel injection amount is determined on the basis of an opening of the electronic throttle valve corresponding to an accelerator depression stroke. This means that a fuel injection amount is determined on the basis of an opening of the electronic throttle valve at the time of closure of the intake valve. Thus, a desired air-fuel ratio is obtained.

Thus, in order to obtain a desired air-fuel ratio during a continuous change in intake air amount, it is necessary to precisely estimate an intake air amount and to determine a fuel injection amount.

SUMMARY OF THE INVENTION

There has been known an internal combustion engine including a unit for controlling intake air amount in addition to an electronic throttle valve. In such an internal combustion engine as well, in order to obtain a desired air-fuel ratio during a continuous change in intake air amount, an intake air amount needs to be estimated precisely. For the purpose of precisely controlling operation of the internal combustion engine as well as the purpose of obtaining a desired air-fuel ratio, it is important to precisely estimate an intake air amount.

It is an object of the invention to precisely estimate an intake air amount in an internal combustion engine having a plurality of devices which control intake air amount.

To achieve the object stated above, there is provided a control apparatus or method for an internal combustion engine in accordance with a first aspect of the invention. According to this apparatus or method, in an internal combustion engine having a plurality of intake air amount control devices which control an amount of air drawn into a combustion chamber in association with a depression stroke of an accelerator pedal, a response of each of the intake air amount control devices is delayed by a delay period with respect to a depression of the accelerator pedal. In the aforementioned first aspect, the delay period may be set such that timings when the intake air amount control devices affect an amount of air drawn into the combustion chamber coincide with one another.

Furthermore, the delay period may be a sum of a control-holding period for each of the intake air amount control devices and a response delay period thereof, and the control-holding period for each of the intake air amount control devices may be set such that delay periods for the intake air amount control devices coincide with one another.

There is also provided a control apparatus or method for an internal combustion engine in accordance with a second aspect of the invention. According to this apparatus or method, in an internal combustion engine having a plurality of intake air amount control devices which control an amount of air drawn into a combustion chamber in association with a depression stroke of an accelerator pedal, control timings of the intake air amount control devices is set such that the control timing of at least one of the intake air amount control devices differs the control timing of at least one other of the intake air amount control devices.

DETAILED DESCRIPTION OF PREFERRED EMBODIMENTS

First Embodiment

Figure 1:
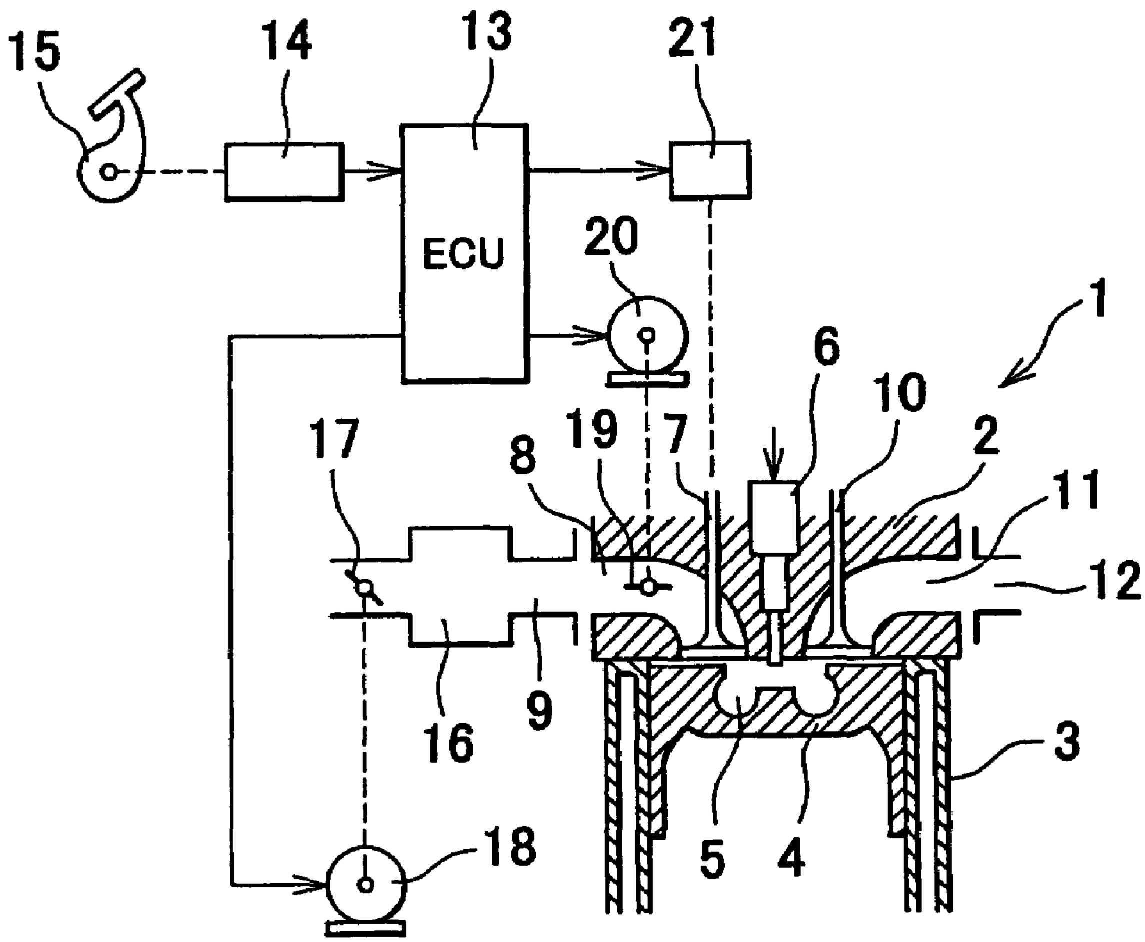
FIG. 1 illustrates an internal combustion engine of the invention.

Hereinafter, the embodiments of the invention will be described with reference to the drawings. FIG. 1 illustrates an internal combustion engine in accordance with one embodiment of the invention. Referring to FIG. 1, reference numerals 1, 2, 3, 4, 5, 6, 7, 8, 9, 10, 11, and 12 denote an engine body, a cylinder head, a cylinder block, a piston, a combustion chamber, a fuel injection valve, an intake valve, an intake port, an intake pipe, an exhaust valve, an exhaust port, and an exhaust pipe, respectively. The internal combustion engine illustrated in FIG. 1 is a spark-ignition four-cylinder internal combustion engine in which fuel is ignited by an ignition plug (not shown). The internal combustion engine is provided with an electronic control unit (ECU) 13, to which a depression stroke sensor 15 for detecting a depression stroke of an accelerator pedal 14 is connected.

The intake pipe 9 is provided with a surge tank 16. An electronically controlled throttle valve 17 for throttling a flow passage of the intake pipe 9 is formed therein. An increase in opening of the throttle valve 17 leads to an increase in amount of air drawn into the combustion chamber 5 (intake air amount). A stepper motor 18 is connected to the throttle valve 17. The throttle valve 17 is driven by the stepper motor 18. The stepper motor 18 is connected to the ECU 13. Operation of the stepper motor 18 is controlled by the ECU 13.

Figure 2:
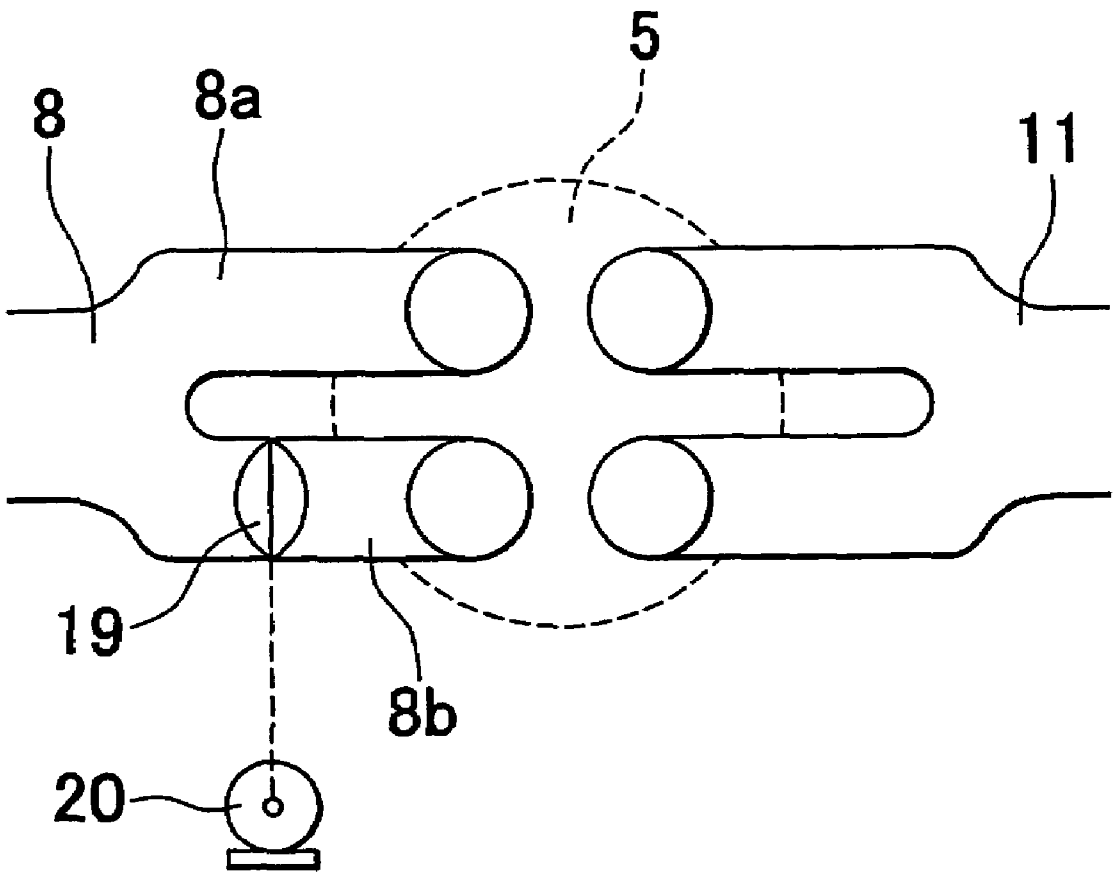
FIG. 2 illustrates intake ports.

An intake air control valve 19 for controlling flow of air flowing into the combustion chamber 5 is disposed in the intake port 8. As shown in FIG. 2, the intake port 8 diverges into two intake port branch pipes 8*a* and 8*b*. The intake air control valve 19 is disposed in one of the intake port branch pipes 8*b*. The intake air control valve 19 can be so controlled as to assume either its fully open state or its fully closed state. If the intake air control valve 19 is fully closed, air flows into the combustion chamber 5 only via one of the intake port branch pipes 8*a*. Therefore, the air that has flown into the combustion chamber 5 flows in a swirl. As a matter of course, the amount of intake air that flows into the combustion chamber 5 when the intake air control valve 19 is fully open is larger than the amount of intake air that flows into the combustion chamber 5 when the intake air control valve 19 is fully closed. A stepper motor 20 is connected to the intake air control valve 19 as well. The intake air control valve 19 is driven by the stepper motor 20. The stepper motor 20 is connected to the ECU 13. Operation of the stepper motor 20 is controlled by the ECU 13.

A valve mechanism 21 for lifting the intake valve 7 is connected thereto. The valve mechanism 21 can change a maximum lift amount and a working angle of the intake valve 7. That is, the valve mechanism 21 can lift the intake valve 7, for example, along different lift curves INa, INb, and INc illustrated in FIG. 3. Namely, the valve mechanism 21 of the invention can continuously change lift characteristics between the lift curve INa indicating that the maximum lift amount and working angle of the intake valve 7 assume maximum values and a lift curve indicating that the maximum lift amount and working angle of the intake valve 7 assume zero. If a maximum lift amount or working angle of the intake valve 7 is increased, an amount of air drawn into the combustion chamber 5 (intake air amount) increases.

Figure 3:
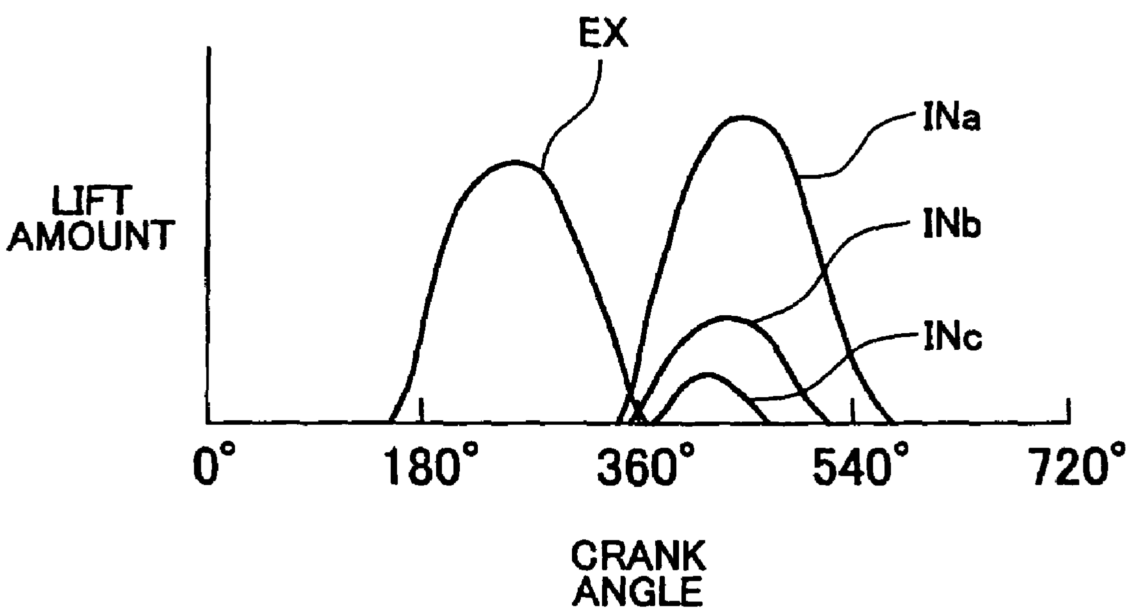
FIG. 3 illustrates lift characteristics of an intake valve.

Referring to FIG. 3, a curve EX represents a lift curve of the exhaust valve 10. In the invention, if one lift curve is replaced with another, timings when the intake valve 7 is opened and closed change as well. The valve mechanism 21 is connected to the ECU 13. Operation of the valve mechanism 21 is controlled by the ECU 13. The valve mechanism 21 may be designed to change only one of maximum lift amount and working angle. In the following description, therefore, maximum lift amount of the intake valve 7, working angle of the intake valve 7, or both of them will be referred to as opening amount of the intake valve 7.

In the first embodiment, opening of the throttle valve 17, operational position of the intake air control valve 19, and opening amount of the intake valve 7 (hereinafter also referred to comprehensively as operational state of the intake air amount control devices) are controlled in association with depression stroke of the accelerator pedal 14 (hereinafter referred to accelerator depression stroke). More specifically, operational state of the intake air amount control devices is controlled such that an increase in required torque resulting from an increase in accelerator depression stroke leads to an increase in intake air amount.

In the first embodiment, an amount of fuel to be injected from the fuel injection valve 6 (fuel injection amount) is determined such that the mixture in the combustion chamber 5 exhibits a target air-fuel ratio, on the basis of an intake air amount at the timing when the intake valve 7 is closed (hereinafter referred to as an intake air amount at the end of intake). It is to be noted herein that there is a fairly short period between termination of an intake stroke and actual injection of fuel. Therefore, if a fuel injection amount were to be determined after detection of an intake air amount at the end of intake, it would be impossible to determine a fuel injection amount before injection of fuel.

In the first embodiment, therefore, a fuel injection amount is determined long before the intake valve 7 is closed. A fuel injection amount is determined on the condition that an intake air amount at the end of intake be estimated. If the estimated intake air amount precisely coincides with an actual intake air amount at the end of intake, the mixture in the combustion chamber 5 exhibits a target air-fuel ratio.

In the first embodiment, as described above, an intake air amount at the end of intake is estimated in determining a fuel injection amount. Accordingly, it is necessary to precisely estimate an intake air amount at the end of intake. If an operational state of each of the intake air amount control devices is changed immediately in response to a change in accelerator depression stroke, it is impossible to precisely foresee an operational state of each of the intake air amount control devices at the end of an intake stroke, in determining a fuel injection amount (hereinafter referred to simply as "in determining an injection amount"). Thus, it is impossible to precisely estimate an intake air amount at the timing of intake.

In the first embodiment, therefore, if an accelerator depression stroke is changed, an operational state of each of the intake air amount control devices is changed after the lapse of a certain delay period. In the first embodiment, a delay period is set such that an operational state of each of the intake air amount control devices at the end of an intake stroke corresponds to an accelerator depression stroke before determining an injection amount. That is, the delay period mentioned herein is set longer than a period ranging from determination of an injection amount to subsequent termination of intake stroke. By thus setting a delay period, it becomes possible to precisely estimate an intake air amount at the end of intake stroke in determining an injection amount, on the basis of an accelerator depression stroke at that moment.

Figure 4:
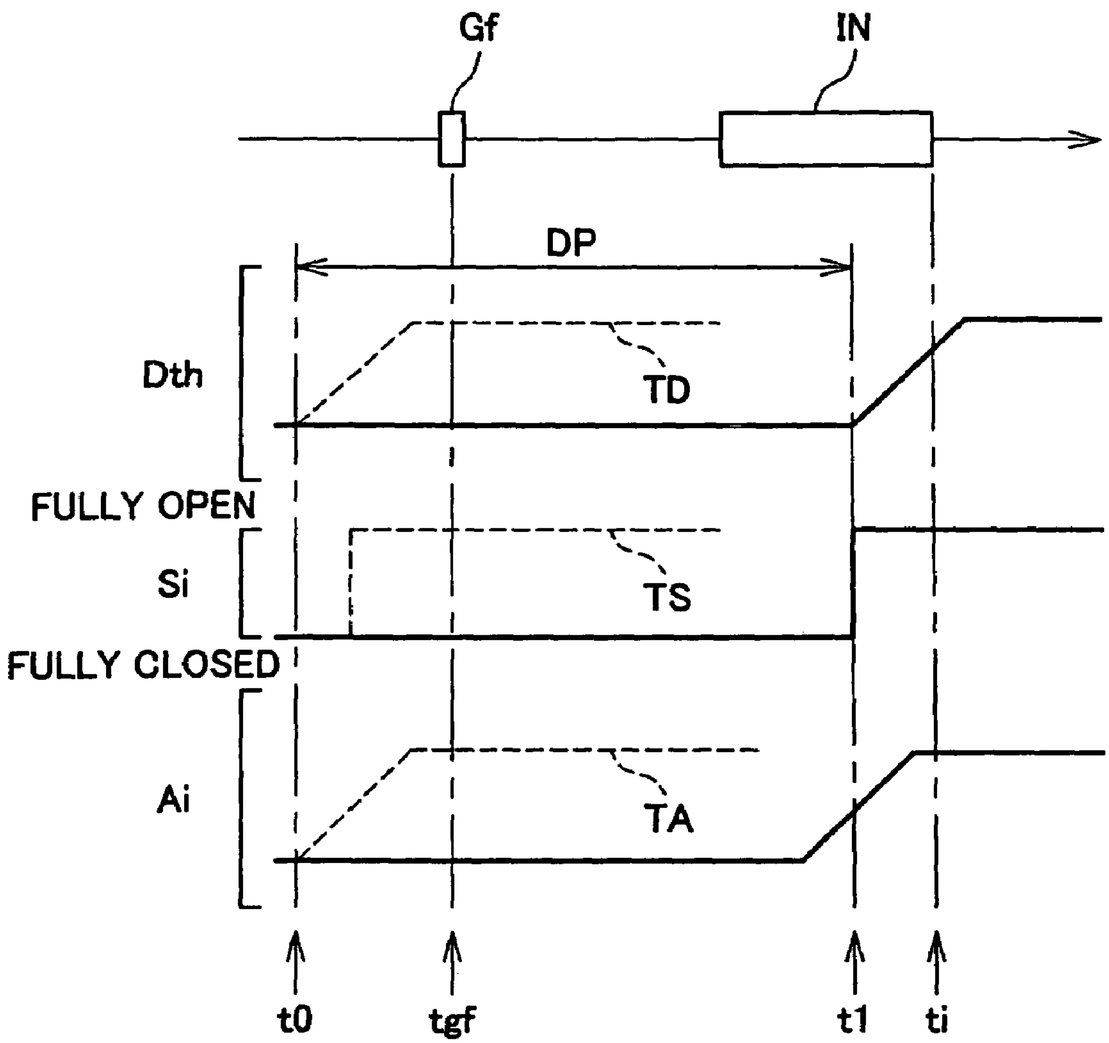
FIG. 4 illustrates a time chart for explaining control performed by intake air amount control devices in accordance with a first embodiment of the invention.

Next, the first embodiment will be described with reference to FIG. 4. Referring to FIG. 4, reference symbols Gf, IN, tgf, ti, Dth, Si, and Ai denote a period for calculating (determining) a fuel injection amount, an open period of the intake valve 7, a timing when an injection amount is determined, a timing when intake stroke is terminated, an opening of the throttle valve 17, an operational state of the intake air control valve 19, and an opening amount of the intake valve 7, respectively.

In an example illustrated in FIG. 4, an accelerator depression stroke increases at a timing t0. Then, as indicated by chain lines TD, TS, and TA in FIG. 4, a target opening of the throttle valve 17 and a target opening amount of the intake valve 7 are increased, and after the lapse of a certain period, a target operational state of the intake air control valve 19 is switched from its fully closed state to its fully open state. In the first embodiment, at a timing t1 when a delay period DP has just elapsed, a command to increase an opening of the throttle valve 17, a command to switch an operational state of the intake air control valve 19 from its fully closed state to its fully open state, and a command to increase an opening amount of the intake valve 7 are actually issued.

Thus, the opening Dth of the throttle valve 17, the operational state Si of the intake air control valve 19, and the opening amount Ai of the intake valve 7 at the timing ti when intake stroke is terminated are equal to a target opening of the throttle valve 17, a target operational state of the intake air control valve 19, and a target opening amount of the intake valve 7 before the timing tgf when an injection amount is determined, respectively. Accordingly, at the timing tgf when an injection amount is determined, an intake air amount at the timing ti when intake stroke is terminated can be precisely estimated on the basis of a target opening of the throttle valve 17, a target operational state of the intake air control valve 19, and a target opening amount of the intake valve 7.

Figure 5:
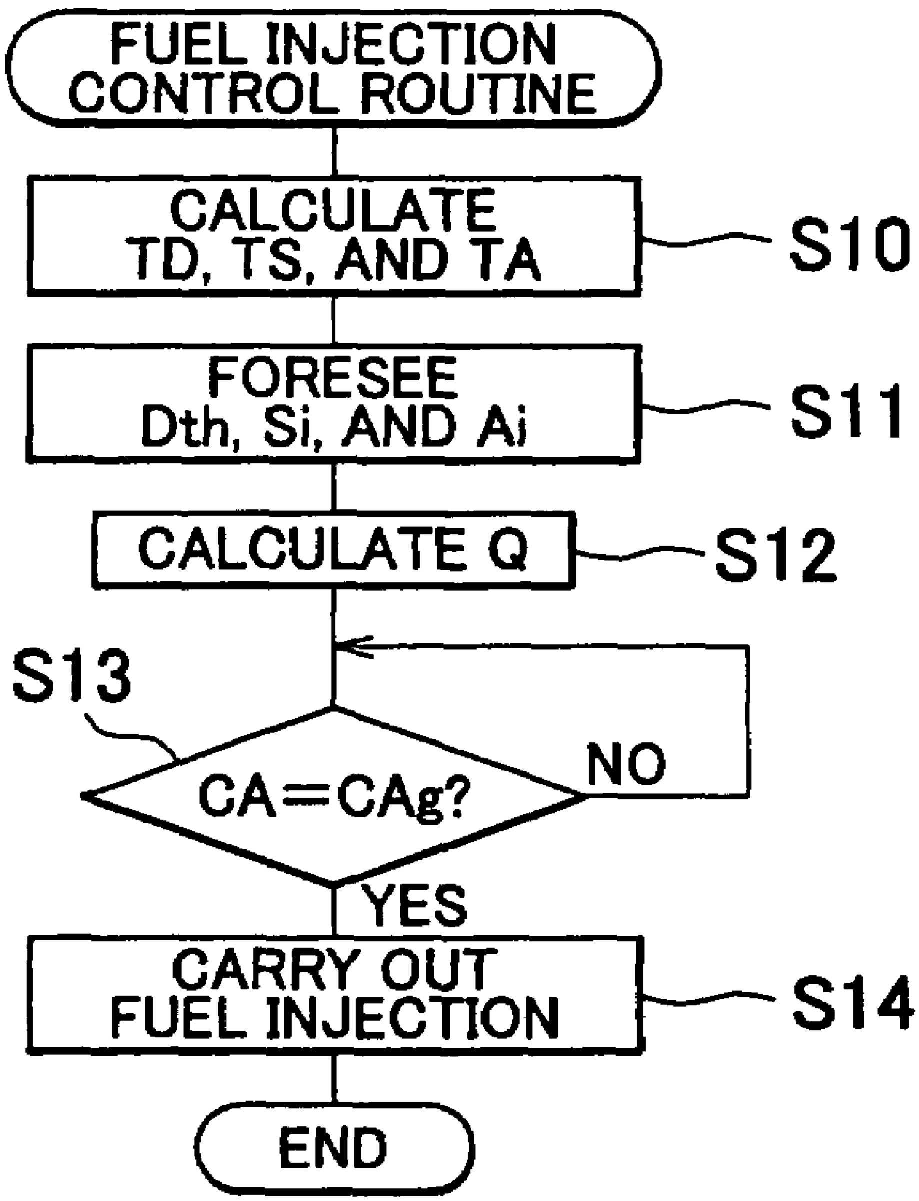
FIG. 5 illustrates a routine for carrying out fuel injection in accordance with the first embodiment.

FIG. 5 illustrates a routine for carrying out fuel injection from the fuel injection valve in accordance with the first embodiment. In the routine illustrated in FIG. 5, first of all in a step 10, a target opening TD of the throttle valve 17, a target state TS of the intake air control valve 19, and a target opening amount TA of the intake valve 7 are calculated. Then in a step 11, an opening Dth of the throttle valve 17 at the end of intake stroke, a state TS of the intake air control valve 19 at the end of intake stroke, and an opening amount Ai of the intake valve 7 at the end of intake stroke are foreseen on the basis of target operational states of the respective intake air amount control devices.

Then in a step 12, a fuel injection amount is calculated (determined) on the basis of the operational states of the respective intake air amount control devices at the end of intake stroke. It is determined then in a step 13 whether or not a crank angle CA corresponds to a fuel injection timing CAq (CA=CAq). If it is determined in the step 13 that CA≠CAq, the step 13 is repeated until it is determined that CA=CAq. If it is determined in the step 13 that CA=CAq, the routine proceeds to a step 14 where fuel injection from the fuel injection valve 6 is carried out.

Figure 6:
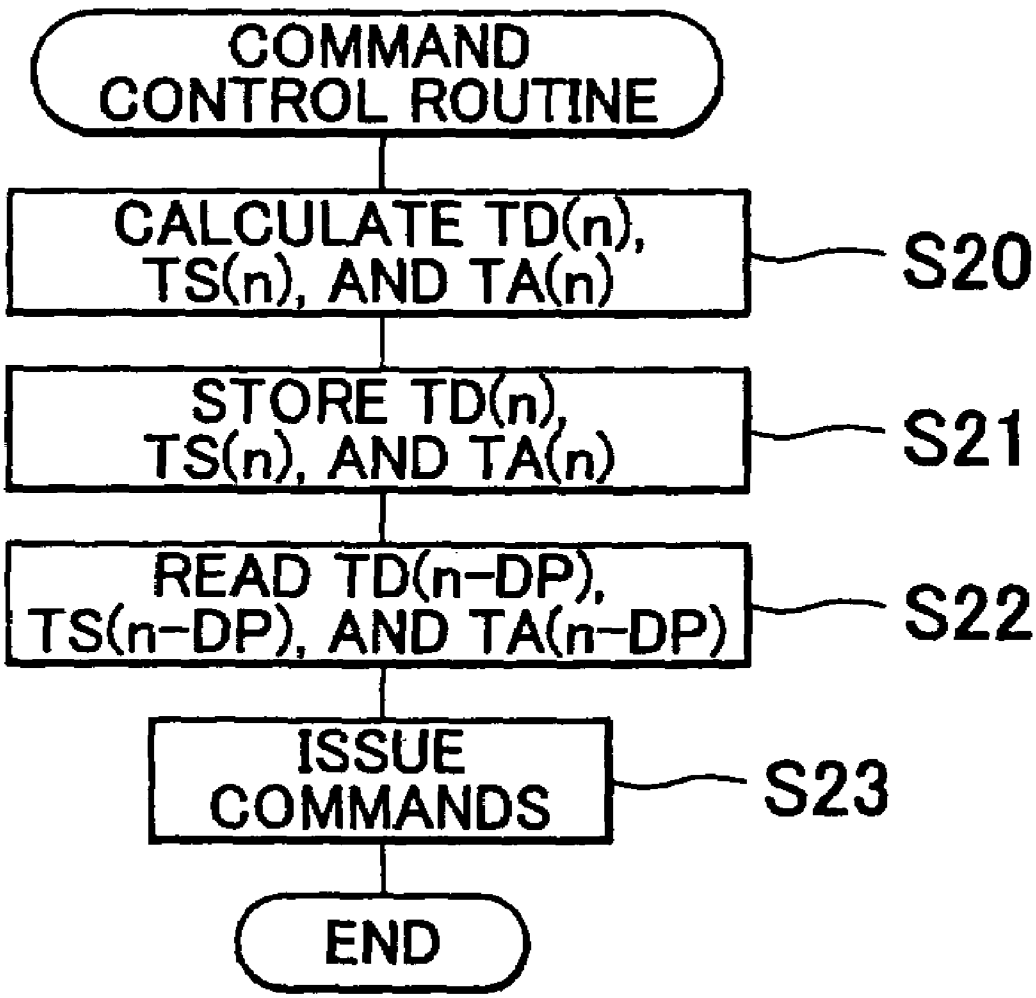
FIG. 6 illustrates a routine for controlling a command to be issued to each of the intake air amount control devices in accordance with the first embodiment.

FIG. 6 illustrates a routine for controlling commands to be issued to the intake air amount control devices in accordance with the first embodiment. In the routine illustrated in FIG. 6, first of all in a step 20, a current target opening TD(n) of the throttle valve 17, a current target state TS(n) of the intake air control valve 19, and a target opening amount TA(n) of the intake valve 7 are calculated. Then, the target opening TD(n), the target state TS(n), and the target opening amount TA(n) are stored into a storage unit (not shown) in a step 21.

Then in a step 22, a target opening TD(n-DP) of the throttle valve 17, a target state TS(n-DP) of the intake air control valve 19, and a target opening amount TA(n-DP) of the intake valve 7 at a timing precedent to the present moment by a predetermined period DP are read. Then in a step 23, commands to equalize operational states of the respective intake air amount control devices with the target operational states TD(n-DP), TS(n-DP), and TA(n-DP) read in the step 22 respectively are issued.

That is, according to this routine, while current target operational states of the respective intake air amount control devices are read, operational states of the intake air amount control devices are equalized with target operational states at a timing precedent to the present moment by the predetermined period DP. In other words, according to this routine, operational states of the respective intake air amount control devices are controlled to be equalized with target operational states after the lapse of a delay of a predetermined period.

Next, the second embodiment will be described. Even after receiving commands to change operational states of the intake air amount control devices (the throttle valve 17, the intake air control valve 19, and the valve mechanism 21), they do not actually start changing their operational states unless a certain period elapses. That is, the intake air amount control devices have a delay in response. This inherent response delay period differs among the intake air amount control devices. Accordingly, in order to equalize operational states of the respective intake air amount control devices with target operational states at the end of intake stroke, delay periods before issuance of commands to change operational states of the respective intake air amount control devices must be set intentionally in consideration of the inherent delays in response of the respective intake air amount control devices.

In the second embodiment, therefore, in consideration of response delay periods of the respective intake air amount control devices, periods (control-holding periods) for withholding (awaiting) issuance of commands to change operational states of the respective intake air amount control devices are set such that total delay periods for all the intake air amount control devices coincide with one another. If an accelerator depression stroke changes, a command to change an operational state of each of the intake air amount control devices is issued after the lapse of a corresponding one of the control-holding periods thus set. The control-holding periods are set longer than a period ranging from determination of an injection amount to subsequent termination of intake stroke. Thus, operational states of the respective intake air amount control devices at the end of intake stroke can be estimated precisely. Therefore, an intake air amount at the end of intake stroke can be estimated precisely. The second embodiment will be described with reference to FIG. 7.

Figure 7:
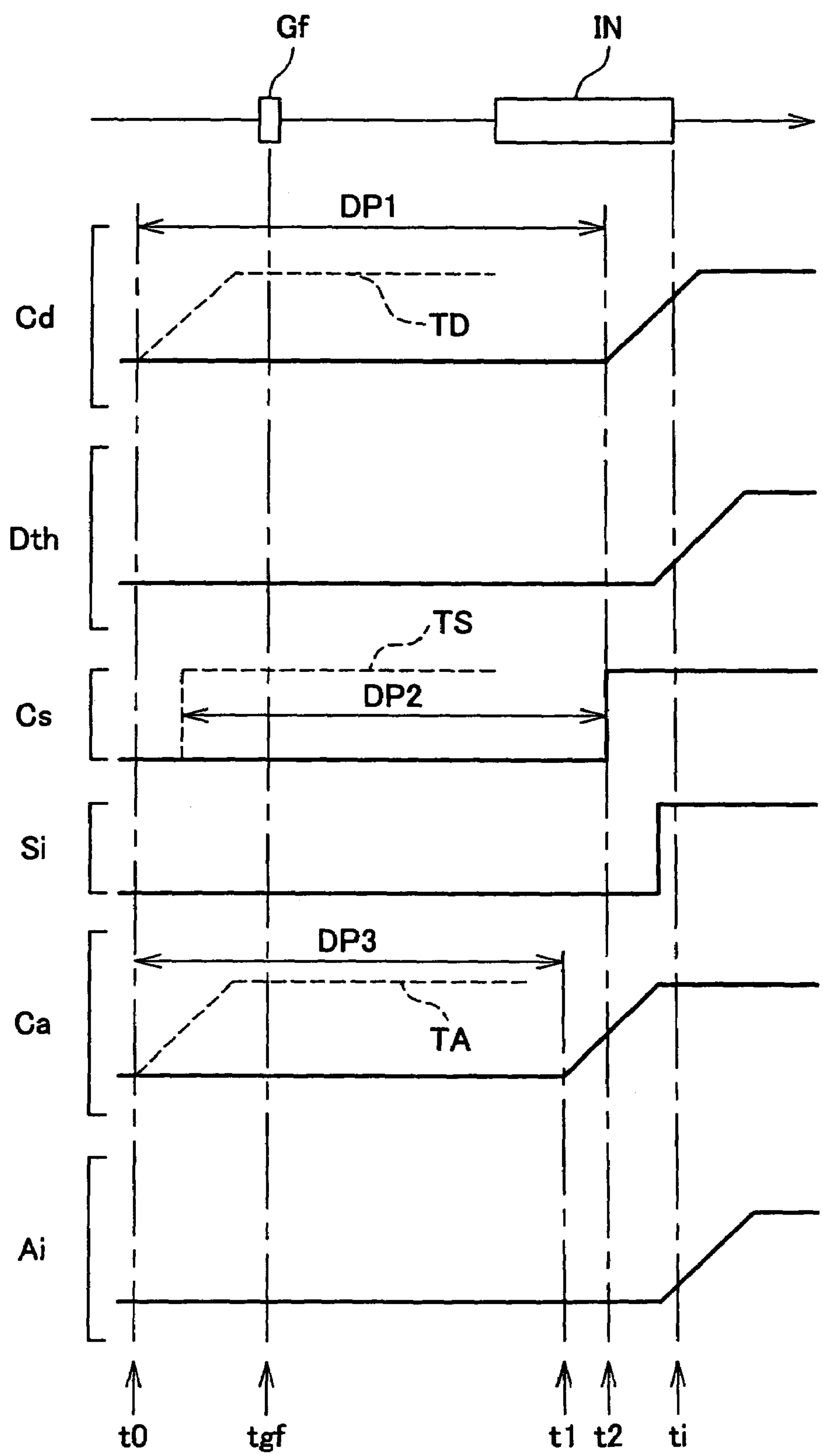
FIG. 7 illustrates a time chart for explaining control performed by intake air amount control devices in accordance with a second embodiment of the invention.

Referring to FIG. 7, reference symbols Gf, IN, tgf, ti, Cd, Dth, Cs, Si, and Ai denote a period for calculating (determining) a fuel injection amount, an opening period of the intake valve 7, a timing when an injection amount is determined, a timing when intake stroke is terminated, a command value for the throttle valve 17, an opening of the throttle valve 17, a command value for the intake air control valve 19, an operational state of the intake air control valve 19, a command value for the valve mechanism 21, and an opening amount of the intake valve 7, respectively.

On the embodiment illustrated in FIG. 7, an accelerator depression stroke increases at a timing t0. Then, as indicated by chain lines TD, TS, and TA in FIG. 7, a target opening of the throttle valve 17 and a target opening amount of the intake valve 7 are increased, and after the lapse of a certain period, a target operational state of the intake air control valve 19 is switched from its fully closed state to its fully open state. In the second embodiment, a command to increase an opening of the throttle valve 17 is actually issued at a timing t2 when a control-holding period DP1 has just elapsed. In addition, a command to switch an operational state of the intake air control valve 19 from its fully closed state to its fully open state is actually issued at a timing t2 when a control-holding period DP2 has just elapsed. Furthermore, a command to increase an opening amount of the intake valve 7 is actually issued at a timing t1 when a cold-holding period DP3 has just elapsed.

Thus, the opening Dth of the throttle valve 17, the operational state Si of the intake air control valve 19, and the opening amount Ai of the intake valve 7, at the timing ti when intake stroke is terminated, are equal to a target opening of the throttle valve 17, a target operational state of the intake air control valve 19, and a target opening amount of the intake valve 7 before the timing tgf when an injection amount is determined, respectively. Accordingly, at the timing tgf when an injection amount is determined, an intake air amount at the timing ti when intake stroke is terminated can be precisely estimated on the basis of the target opening of the throttle valve 17, the target operational state of the intake air control valve 19, and the target opening amount of the intake valve 7.

Figure 8A:
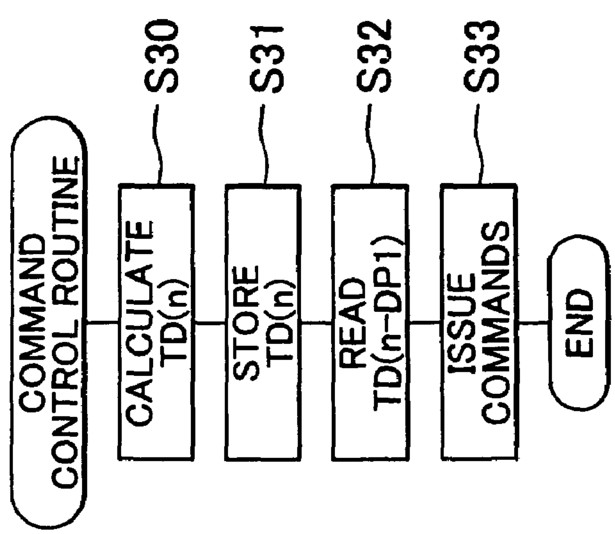
FIG. 8 illustrates a routine for controlling a command to be issued to each of the intake air amount control devices in accordance with the second embodiment.
Figure 8B:
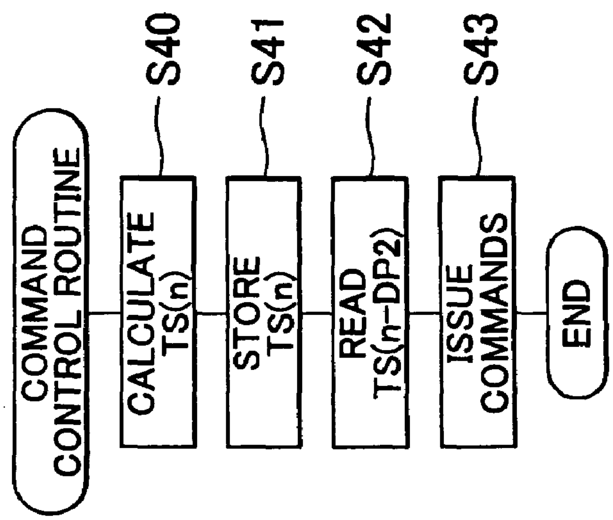
Figure 8C:
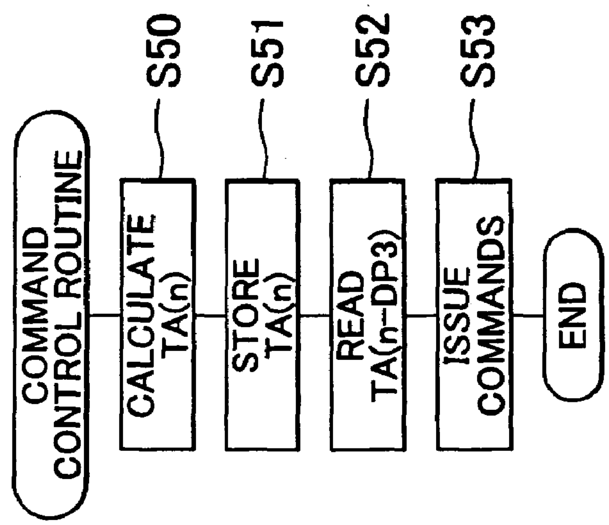

FIGS. 8A, 8B, and 8C illustrate routines for controlling commands to be issued to the intake air amount control devices in accordance with the second embodiment. FIG. 8A illustrates a routine for controlling a command to be issued to the throttle valve 17. FIG. 8B illustrates a routine for controlling a command to be issued to the intake air control valve 19. FIG. 8C illustrates a routine for controlling a command to be issued to the valve mechanism 21.

In the routine illustrated in FIG. 8A, first of all in a step 30, a current target opening TD(n) of the throttle valve 17 is calculated. Then, the target opening TD(n) is stored into the storage unit (not shown) in a step 31. Then, a target opening TD(n-DP1) of the throttle valve 17 at a timing precedent to the present moment by a predetermined period DP1 is read in a step 32. Then, a command to equalize an opening of the throttle valve 17 with the target opening TD(n-DP1) read in the step 32 is issued in a step 33. That is, according to this routine, the throttle valve 17 is so controlled as to assume the target opening after the lapse of a delay period that is equal to the sum of the predetermined period DP1 and a response delay period of the throttle valve 17.

In the routine illustrated in FIG. 8B, first of all in a step 40, a current target operational state TS(n) of the intake air control valve 19 is calculated. Then, the target operational state TS(n) is stored into the storage unit (not shown) in a step 41. Then, a target operational state TS(n-DP2) of the intake air control valve 19 at a timing precedent to the present moment by a predetermined period DP2 is read in a step 42. Then, a command to equalize an operational state of the intake air control valve 19 with the target operational state TS(n-DP2) read in the step 42 is issued in a step 43. That is, according to this routine, the intake air control valve 19 is so controlled as to assume the target operational state after the lapse of a delay period that is equal to the sum of the predetermined period DP2 and a response delay period of the intake air control valve 19.

In the routine illustrated in FIG. 8C, first of all in a step 50, a current target opening amount TA(n) of the intake valve 7 is calculated. Then, the target opening amount TA(n) is stored into the storage unit (not shown) in a step 51. Then, a target opening amount TA(n-DP3) of the intake valve 7 at a timing precedent to the present moment by a predetermined period DP3 is read in a step 52. Then, a command to equalize an opening amount of the intake valve 7 with the target opening amount TA(n-DP3) read in the step 52 is issued in a step 53. That is, according to this routine, the intake valve 7 is so controlled as to assume the target opening amount after the lapse of a delay period that is equal to the sum of the predetermined period DP3 and a response delay period of the valve mechanism 21.

Although only opening amount of the intake valve 7 is taken into account in the aforementioned embodiment, it is also appropriate that lift timing of the intake valve 7 be taken into account instead of or in addition to opening amount thereof.

According to the embodiments of the invention, a response delay period is set for each of the intake air amount control devices. Thus, it is possible to know how the respective intake air amount control devices will change in operational state before they actually do. Accordingly, it is possible to estimate in advance an amount of air drawn into the combustion chamber when the respective intake air amount control devices actually change in operational state in response to a depression stroke of the accelerator pedal. Namely, this makes it possible to precisely estimate an amount of air drawn into the combustion chamber.

What is claimed is:

1. An intake air amount control apparatus for an internal combustion engine, comprising:

a plurality of intake air amount control devices which control an amount of air drawn into a combustion chamber in association with a depression stroke of an accelerator pedal; and a controller which sets control timings of the intake air amount control devices such that the control timing of at least one of the intake air amount control devices differs from the control timing of at least one other of the intake air amount control devices.

2. The apparatus according to claim 1, wherein the controller sets the control timing of each of the intake air amount control devices based on a response delay period for each of the intake air amount control devices such that the control timing of at least one of the intake air amount control devices differs from the control timing of at least one other of the intake air amount control devices.

3. The apparatus according to claim 2, wherein the controller sets the control timing of each of the intake air amount control devices such that timings when the intake air amount control devices affect an amount of air drawn into the combustion chamber coincide with one another.

4. The apparatus according to claim 1, wherein the controller sets the control timing of each of the intake air amount control devices such that timings when the intake air amount control devices affect an amount of air drawn into the combustion chamber coincide with one another.

5. The apparatus according to claim 1, wherein the intake air amount control devices are disposed in a passage through which air is drawn into the combustion chamber and include a throttle valve for adjusting a flow area of the passage.

6. The apparatus according to claim 1, wherein the intake air amount control devices include an intake air control valve which diverges from an intake passage, which is disposed in at least one of a plurality of branch passages for introducing air into the combustion chamber, and which adjusts a flow area of said at least one of the branch passages.

7. The apparatus according to claim 1, wherein the intake air amount control devices include an intake valve of the combustion chamber.

8. A method of controlling an intake air amount of an internal combustion engine which is provided with a plurality of intake air amount control devices which control an amount of air drawn into a combustion chamber, comprising the steps of:

setting control timings of the intake air amount control devices such that the control timing of at least one of the intake air amount control devices differs from the control timing of at least one other of the intake air amount control devices.

* * * * *